W. H. RICHMOND.
Coal-Breaking Machinery.

No. 216,807. Patented June 24, 1879.

Attest:
H. H. Schott.
J. Mason Gazzler

Wm. H. Richmond
Inventor:

UNITED STATES PATENT OFFICE.

WILLIAM H. RICHMOND, OF SCRANTON, PENNSYLVANIA.

IMPROVEMENT IN COAL-BREAKING MACHINERY.

Specification forming part of Letters Patent No. 216,807, dated June 24, 1879; application filed February 15, 1879.

*To all whom it may concern:*

Be it known that I, WILLIAM H. RICHMOND, of Scranton, in the county of Lackawanna and State of Pennsylvania, have made certain Improvements in Coal-Breaking Machines, of which the following is a specification.

This invention relates to that kind of a machine in which the coal is broken to the proper size by two revolving toothed cylinders, the teeth taking hold of and breaking the coal to the proper size, and when so broken passes it between the toothed cylinders, and allows it to fall beneath them.

The invention consists in the construction of the cylinders and their teeth in such manner that the teeth can be removed or graduated at any desired distance apart, be firmly held in position, and yet be easily replaced after removal from the cylinders, as will be fully hereinafter described.

Figure 1:
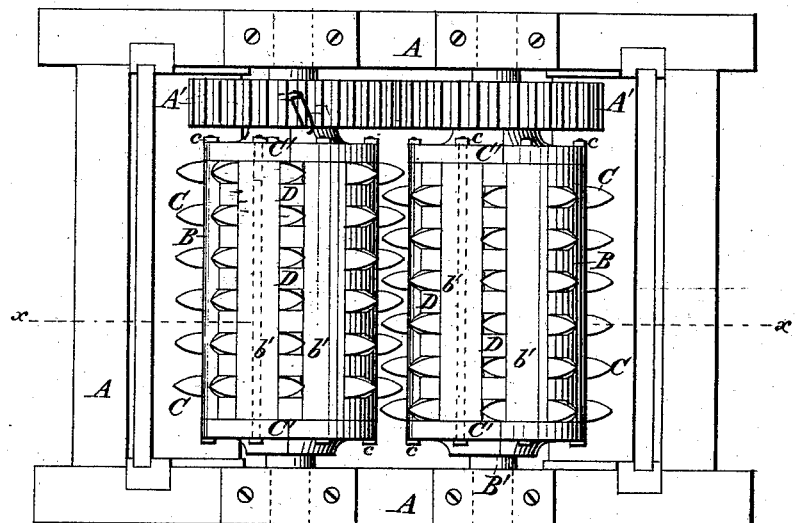
Figure 4:
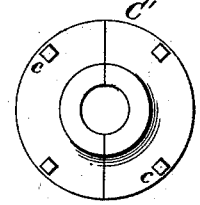
Figure 2:
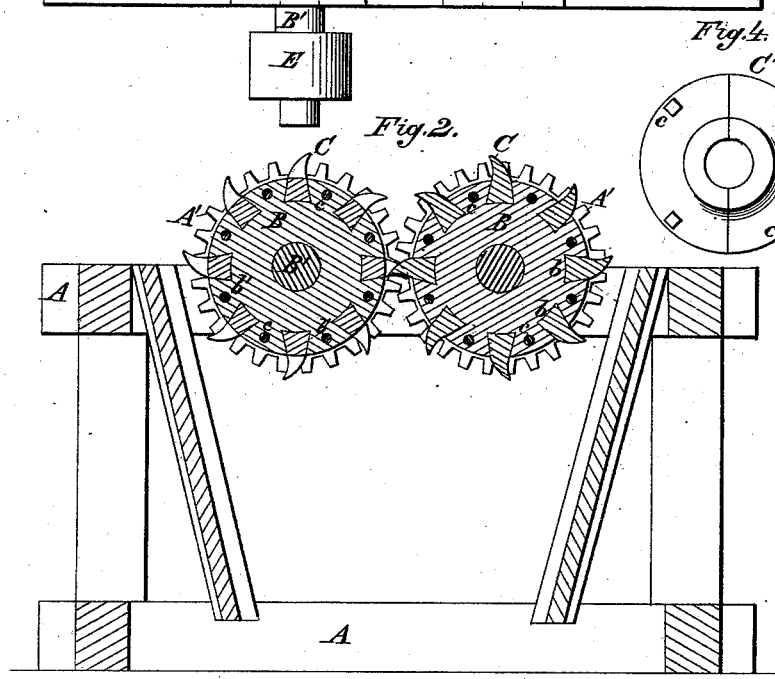
Figure 3:

In the drawings, Fig. 1 represents a top or plan view of the machine; Fig. 2, a transverse section on line $x\,x$, of Fig. 1. Fig. 3 is a modification of the construction of parts, and Fig. 4 shows a divided head or clamp-piece of the cylinder.

A is the framing that supports the breaking-cylinders or toothed rollers, which are made to revolve by the driven pulley E on shaft B' of one of the cylinders and toothed gear-wheels A' A' on the ends of the shafts of the cylinders.

B B are the toothed cylinders, mounted on shafts B', and having longitudinal dovetail grooves $b$ in their faces at proper distances apart, and of sufficient depth to hold the dovetailed shanks of the teeth firmly and securely therein, while the spaces $b'$ between the grooves will be left in the form shown in cross-section in Fig. 2.

C C are the projecting breaking-teeth, having the front part of the teeth set forward, or overhanging a radial line, and slightly curved or straight. The shank or that part that goes into the cylinder is larger at its base than at the face of the cylinder, while the base bears firmly upon the bottom of the groove, and the front and rear sides fit the sides of the grooves. They are inserted in the cylinder by sliding them from the ends of the cylinders into the grooves toward the center or opposite end.

D D are blocks that are placed between the teeth in the grooves $b$ to determine the distance the teeth C shall be apart, and thereby the size of the broken coal. As many different sizes of these blocks are used as there may be sizes of broken coal desired and they are made to fit into the grooves closely, the same as the shanks of teeth C.

C' C' are heads to the cylinders, one to each end, and of the same diameter as the cylinders, and when the teeth C and blocks D are inserted in the grooves to exactly fill the length of the cylinders, the heads are then secured to the cylinders by the screw-bolts and nuts $c\,c$, that pass longitudinally through the cylinder between the grooves and through the heads C', and when tightly screwed up hold the teeth firmly in their places. These heads are made in halves, as seen in Fig. 4, so that they can be removed without taking the cylinders out of their bearings when it is necessary to change the teeth and gage-blocks for any purpose; and by being so constructed is an important feature in the invention, as it saves time and labor in making changes.

Instead of bolts or rods going longitudinally through the cylinders, screw-bolts, going through the heads and screwed into screw-tapped holes in the cylinder, can be used in their place. These cylinders may be of cast metal, with the grooves for the teeth cast therein. The teeth are also cast either of iron or cast-steel, or they may be of wrought metal and tempered; but whether of cast or wrought metal, the surfaces are of such form that the sides of the teeth or the sides of the grooves in the cylinders can easily be planed to size and form by machine-work, if needed. The intermediate or gage blocks D will also be of cast-iron, and are easily constructed to fit into the grooves.

The shanks of the teeth may be constructed as seen in Fig. 3, and the grooves in the cylinders have a corresponding shape to fit, as such construction would be only a modification of that above described, and no departure from it in principle or operation.

A coal-breaker thus constructed is durable, cheap, effective, and at the same time easily repaired, and when teeth are to be taken out or to be changed to break a different size of coal by inserting smaller or larger gage-blocks between the teeth, this construction of cylinder and teeth is of great importance in the time saved in the making of such change.

I do not claim, broadly, for a longitudinal dovetail-grooved cylinder, and the dovetail part or parts that may fit into such grooves, as such construction in mechanics is old; and I confine my invention to the cylinders of a coal-breaking machine, the use of such construction therein being entirely different from its use in other machines.

Having thus described my invention, what I claim is—

1. In a machine for breaking coal, the combination of the longitudinally-grooved cylinders B, breaking-teeth C, gage-blocks D, and heads C' with screw-bolts c, constructed substantially as described.

2. In machines for breaking coal, the combination of the cylinder B, having longitudinal grooves b therein, with the dovetail-shanked teeth C, constructed to be forced into the grooves from the ends of the cylinder, and be firmly held therein when in place, substantially as described.

3. In machines for breaking coal, the cylinder B, in which the teeth C are adjusted as to distance apart in the longitudinal grooves b by means of the removable gage-blocks D, whereby the same cylinder and its teeth will break coal of different sizes by a change of the gage-blocks, as described.

4. The cylinder-heads C', made in halves, in combination with the screw bolts or rods c and cylinders B, by which construction the teeth and blocks may be removed or inserted without taking the cylinder out of its bearings, as described and shown.

WM. H. RICHMOND.

Witnesses:
  J. W. HAMILTON JOHNSON,
  J. MASON GOSZLER.